Patented Oct. 2, 1951

2,570,051

UNITED STATES PATENT OFFICE 2,570,051

INSECTICIDAL COMPOSITIONS CONTAINING BETA - (TERTIARY - ALKYL THIO) ALKANOLS

Lawrence T. Eby, Roselle, N. J., assignor to Standard Oil Development Company, a corporation of Delaware No Drawing. Application November 5, 1945, Serial No. 626,893

11 Claims. (Cl. 167—22)

The present application is a continuation-in-part of U. S. Serial No. 607,257, filed July 26, 1945. This invention relates to insecticidal compositions in which sulfur bearing alcohols particularly beta-(tertiary-alkyl thio) ethanols are employed as active toxicants.

An object of this invention is to provide material suitable for insecticides.

Another object of the invention is to provide materials of value as insecticides which are relatively non-toxic to man and domestic animals when taken by mouth and which can be used in place of lead arsenate and other toxic materials for destroying insects.

Many synthetic organic compounds have been suggested as substitutes for lead, arsenic and copper-containing inorganic compounds as currently employed in insecticidal compositions. Many of these synthetic materials are injurious to plants, toxic to humans, and incompatible with other insecticidal materials.

It has now been discovered that substances belonging to the class of sulfur bearing alcohols and more specifically designated as beta-(tertiary-alkyl thio) ethanols have a specific toxic effect upon insects, and this invention embraces the application of said materials to the destruction of insects.

The sulfur bearing alcohols of the particular class known as beta-(tertiary-alkyl thio) ethanols are, for the most part, colorless liquids having a low vapor pressure, especially when the tertiary-alkyl component of the molecule contains eight or more carbons. They are stable to light and air and are not appreciably affected by carbon dioxide. These compounds may be prepared by the reaction of tertiary-aryl mercaptans with an alkylene oxide in the presence of an alkaline catalyst, such as a hydroxide of an alkali metal or a hydroxide of an alkaline earth metal or an alkyl substituted ammonium hydroxide such as a tetra-alkylammonium hydroxide, an example of which is tetra-methylammonium hydroxide. The reaction temperature may be from 0° to 150° C., the preferred range is from 20° to 100° C. The catalyst may be an aqueous solution of the alkaline compound and the percent of the alkaline compound dissolved in water may be from 5–50%.

The preparation of the individual compounds is illustrated in the following examples:

Example I 292 grams of diisobutylmercaptan was added with stirring to 80 g. of 10% NaOH in a 1-liter 3-neck round bottom flask whereupon a white precipitate formed. An excess of ethylene oxide was bubbled into the solution during a period of 32 minutes while the temperature was kept between 30 and 40° C. Stirring was continued for one hour after ethylene oxide addition was finished and there were two layers which separated when stirring was stopped. The organic layer was separated, washed with water, dried over anhydrous $K_2CO_3$ and distilled in an atmosphere of nitrogen. 331 grams (86.7% of the theoretical) of beta (tertiary-octyl thio) ethanol was distilled at 95–106° at a pressure less than 1 mm. This fraction showed a refractive index of $N_D^{20}=1.4839$.

Example II 292 grams (2 mols) of diisobutyl mercaptan was added to 80 g. of 10% aqueous NaOH solution in a 1-liter 3-neck round bottom flask with stirring. 121.8 g. (2.1 mols) of propylene oxide were dropped into the flask over a period of 35 minutes while the temperature was kept between 25 and 30° C., the mixture was then stirred at room temperature (26° C.) for 12 hours. The organic layer was separated, dried over anhydrous $K_2CO_3$ and distilled. 345.1 g. of beta (tertiary-octyl thio) isopropanol, B. P. 83–95° at a pressure less than 1 mm. were obtained which is 84.6% of the theoretical. This fraction showed a refractive index of $N_D^{20}=1.4801$ and the following analytical results were thus obtained:

|   | Found | Calculated for beta (tertiary-octyl thio) isopropanol |
|---|---|---|
|   | Per cent | Per cent |
| C | 64.89 | 64.69 |
| H | 11.87 | 11.77 |
| S | 15.33 | 15.68 |

Example III

Ethylene oxide was bubbled into a well-stirred solution of 50.5 grams of tertiarydodecyl mercaptan, prepared from commercial triisobutylene, and 10 cc. of 10% aqueous sodium hydroxide in a 500 cc. flask over a period of two hours. The initial temperature was 36.5° C. and it rose to 82° C. The flask was not cooled by external means during this time. The total weight gained was 14.9 grams. After standing overnight, the solution was extracted with ether; the ether extract was washed first with dilute HCl and then with dilute aqueous sodium bicarbonate and finally, dried over anhydrous potassium carbonate. The ether solution was filtered and fractionally distilled. Beta-(tertiarydodecyl thio) ethanol was obtained.

Example IV 20.8 grams of propylene oxide was dropped during a period of five minutes into a vigorously stirred solution of 50.5 grams of tertiarydodecylmercaptan, prepared from commercial triisobutylene, and 10 c. c. of 10% aqueous sodium hydroxide in a 500 c. c. flask. The temperature was kept below 35° C. for two hours after the addition was finished. The stirring was continued for 18 hours. The solution was extracted with ether, which extract after being washed first with dilute HCl and then with dilute aqueous sodium bicarbonate, was dried over anhydrous potassium carbonate. The ether solution was filtered and fractionally distilled. Beta-(tertiary-dodecyl thio) isopropanol was obtained.

While this invention is concerned with insecticidal compositions containing sulfur-bearing alcohols of the general formula:

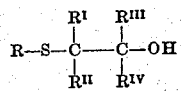

It is particularly concerned with and directed to sulfur-bearing alcohols of the type represented by the general formula set out below:

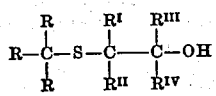

Where the R groups in both graphic formulas are all organic groups of alkyl, aryl, aralkyl or alkaryl which may be substituted with halogens or other organic or inorganic substituents and may or may not be similar; and $R^I$, $R^{II}$, $R^{III}$ and $R^{IV}$ in both graphic formulas are each hydrogen or organic groups of alkyl, aryl, alkaryl or aralkyl nature, wherein the organic groups may have inorganic or organic substituents.

The compounds represented by the general formula set out above may be employed generally as toxicants in insecticidal preparations. They may be used as constituents of either dusting or spraying compositions. When used in dusting compositions they may be compounded with various inert carriers, such as diatomaceous earth, bentonite, talc, sulfur, wood flours and the like, to form dusting powders adapted to be applied with standard dusting equipment. Since the sulfur-bearing alcohols described are generally liquids the amount absorbed on the inert carrier should not be great enough to impair the free flow of the composition. The concentration of sulfur-bearing alcohols in dusting compositions is preferably between about 0.01 to 5.0 per cent by weight.

The preferred form of insecticidal preparation containing the described sulfur-bearing alcohols is made by dissolving the said sulfur-bearing alcohols in mineral oil to the extent of 1-90% by weight. However, the composition type in which the sulfur-bearing alcohol is employed and the composition thereof in the final composition are dependable upon the particular insect to be controlled, and the circumstances under which such control is to be accomplished.

In other embodiments of the invention the sulfur-bearing alcohols may be employed as an aqueous emulsion in combination with an emulsifying agent and also the sulfur-bearing alcohols may be dissolved in a small amount of mineral oil to form a concentrated solution and subsequently preparing an aqueous emulsion by emulsifying the mineral oil solution by means of a dispersing or emulsifying agent.

The sulfur-bearing alcohols may be used in an insecticidal composition wherein a volatile solvent such as Freon is used as an agent for finely dispersing the insecticidal component in air and wherein other active toxicants may be in combination with the sulfur-bearing alcohol. Other toxicants used may be D. D. T., rotenone, and pyrethrum.

The sulfur-bearing alcohols may be incorporated in other standard type insecticidal compositions either as the sole toxic ingredient of such composition or in combination with such materials as inorganic pigments, organic dyes, lead arsenate, pyrethrin, rotenone, cryolite, zinc sulfide, organic thiocyanates, sulfur, nicotine, etc.

The examples are illustrative with respect to the particular sulfur-bearing alcohol, composition type, and concentration employed but are not to be construed as limiting the invention:

Example V

An 8% by weight solution of beta (tertiary-octyl thio) ethanol in refined mineral oil was tested as a spray for activity and effectiveness against the house fly according to a modified Peet-Grady test:

|  | Per cent down in 2 mins | Per cent down in 5 mins. | Per cent down in 10 mins. | Per cent dead in 24 hrs. |
| --- | --- | --- | --- | --- |
| Mineral Oil without additive | 20 | 29 | 35 | 7 |
| Do | 11 | 15 | 27 | 9 |
| Mineral Oil with 8% by weight of beta-(tertiary-octyl thio) ethanol. | 53 | 79 | 81 | 53 |
|  | 45 | 97 | ---------- | 27 |

Example VI

An 8% by weight solution of beta (tertiary-actyl thio) isopropanol in refined mineral oil was tested in the same manner as in Example 5.

|  | Per cent down in 2 mins. | Per cent down in 5 mins. | Per cent dead in 24 hrs. |
| --- | --- | --- | --- |
| Mineral oil with 8% by weight of beta-(tertiary-octyl thio) isopropanol | 55 | 71 | 26 |
|  | 31 | 37 | 33 |

Other examples of sulfur-bearing alcohols affective as insecticides are: tertiarybutyl thio tertiary-butanol, beta (tertiary-amyl thio) ethanol, beta (tertiary-butyl thio) ethanol, beta (tertiary-butyl thio) isopropanol, beta (tertiary-octyl thio) secondary butanol, tertiary-octyl thio tertiary-butanol, beta (tertiary-dodecyl thio) ethanol and beta (tertiary-dodecyl thio) isopropanol. The scope of the invention is not intended to be limited by these examples.

Having thus described the invention, what is pointed out with particularity and distinctly claimed as the invention is:

1. An insecticidal composition containing a beta-(tertiary-alkyl thio) alkanol in which the alkanol radical linked to the S atom has from two to four carbon atoms inclusive, as the active ingredient admixed with an emulsifying agent which lowers the surface tension of water and thereby promotes aqueous colloidal emulsions of the active ingredient.

2. A mineral oil insecticidal spray composition comprising a beta-(tertiary-alkyl thio) alkanol in which the alkanol radical linked to the S atom has from two to four carbon atoms inclusive, dissolved in the mineral spray oil.

3. A mineral oil insecticidal spray composition comprising a mineral spray oil, an emulsifying agent, water and a beta-(tertiary-alkyl thio) alkanol in which the alkanol radical linked to the S atom has from two to four carbon atoms, inclusive.

4. An insecticidal composition comprising a beta-(tertiary-alkyl thio) alkanol in which the alkanol radical linked to the S atom has from two to four carbon atoms, inclusive, as the active ingredient admixed with a solid, powdered, inert diluent.

5. An insecticidal dust composition comprising a beta-(tertiary-alkyl thio) alkanol in which the alkanol radical linked to the S atom has from two to four carbon atoms, inclusive, as the active ingredient admixed with a powdered clay.

6. An insecticidal dust composition comprising a beta-(tertiary-alkyl thio) alkanol in which the alkanol radical linked to the S atom has from two to four carbon atoms, inclusive, as the active ingredient admixed with bentonite.

7. An insecticidal composition comprising a beta-(tertiary-alkyl thio) alkanol in which the alkanol radical linked to the S atom has from two to four carbon atoms, inclusive, as the active ingredient contained in an aqueous emulsion with an emulsifying agent.

8. An insecticidal composition as in claim 2 in which the active ingredient is beta-(tertiary-octyl thio) ethanol.

9. An insecticidal composition as in claim 2 in which the active ingredient is beta-(tertiary-octyl thio) isopropanol.

10. An insecticidal composition as in claim 6 in which the active ingredient is beta-(tertiary-octyl thio) ethanol.

11. An insecticidal composition as in claim 6 in which the active ingredient is beta-(tertiary-octyl thio) isopropanol.

LAWRENCE T. EBY.

REFERENCES CITED

The following references are of record in the file of this patent:

UNITED STATES PATENTS

| Number | Name | Date |
| --- | --- | --- |
| 2,043,941 | Williams | June 9, 1936 |
| 2,129,709 | Schuette | Sept. 13, 1938 |
| 2,191,564 | Graenacher et al. | Feb. 7, 1940 |
| 2,205,021 | Schuette et al. | June 18, 1940 |
| 2,402,878 | Doumani | June 25, 1946 |

FOREIGN PATENTS

| Number | Country | Date |
| --- | --- | --- |
| 463,544 | Great Britain | Mar. 30, 1937 |
| 665,371 | Germany | Sept. 24, 1938 |

OTHER REFERENCES

Nenitzescu et al., Berichte, vol. 68 B, pp. 587–591. (Copy in Sci. Libr.)

Beilstein, "Handbuch der Organischen Chem.," 4th ed., vol. 1, supp. 2, p. 544. (Copy in Div. 6.)